Patented Feb. 8, 1938

2,107,911

UNITED STATES PATENT OFFICE 2,107,911

PROCESS OF PREPARING 1-METHYL NAPHTHALENE-7-SULPHONIC ACID AND 1-METHYL-7-HYDROXYNAHPTHALENE

Adolf Sieglitz, Frankfort-on-the-Main, Germany, assignor to General Aniline Works, Inc., New York, N. Y., a corporation of Delaware No Drawing. Application July 6, 1936, Serial No. 89,251. In Germany July 6, 1935

3 Claims. (Cl. 260—154)

The present invention relates to a process of preparing 1-methylnaphthalene-7-sulphonic acid which has hitherto not been known and 1-methyl-7-hydroxynaphthalene.

I have found that these compounds may be obtained in a technically simple way by deaminating 1-methyl-4-aminonaphthalene-7-sulphonic acid, obtainable, for instance, as described in the French Patent No. 807,842 and my co-pending U. S. patent application Serial No. 89,250 filed July 6, 1936 for "Methyl-aminonaphthalene-sulphonic acids and process of preparing them", and melting the 1-methylnaphthalene-7-sulphonic acid thus obtained in the form of its alkali metal salt with caustic alkali to produce 1-methyl-7-hydroxynaphthalene.

The known methods of making 1-methyl-7-hydroxynaphthalene are very tedious and commerically useless. See V. Vesely and F. Stursa ("Coll. Trav. Chim. Tchécoslovaquie" 5, 170/1933) and R. D. Harworth and G. Sheldrick ("J. Chem. Soc." 1934, 1950).

The statements made in the Bull. Int. Acad. Polon. d. Sciences et d. Lettres, serie A 1929, 604, about the manufacture of 1-methylnaphthalene-7-sulphonic acid and 1-methyl-7-hydroxynaphthalene are erroneous, as already pointed out by V. Vesely and F. Stursa (l. c.), and in the meantime have been revoked by the author ("Bull. Internat. Acad. Polon. d. Sciences et d. Lettres", Classe s. Sc. math. et nat. No. 3-4 A, March-April 1935, page 201-208). In the last named literature reference it is stated that the compound which was originally defined as 7-sulphonic acid is the 6-sulphonic acid. It follows that the present specification describes for the first time a process for the manufacture of 1-methylnaphthalene-7-sulphonic acid and a commercially useful way for the manufacture of 1-methyl-7-hydroxynaphthalene.

The compounds obtained are valuable parent materials for the manufacture of dyestuffs.

The following examples serve to illustrate the invention, the parts being by weight unless stated otherwise; the relationship of parts by weight to parts by volume is that of the kilo to the litre:

1. 259 parts of the sodium salt of 1-methyl-4-aminonaphthalene-7-sulphonic acid obtainable, for instance, by the process of my co-pending application above referred to are dissolved in 750 parts of water, 70 parts of sodium nitrite are added and the solution is caused to run slowly into a mixture of 750 parts of ice and 150 parts of concentrated sulphuric acid. After 3 hours vigorous stirring, the suspension of the diazocompound obtained is introduced, while strongly stirring, into 5000 parts by volume of boiling ethyl alcohol. After the diazo-reaction has disappeared, the alcohol is distilled. The mixture is allowed to cool and the 1-methylnaphthalene-7-sulphonic acid obtained is filtered with suction and then dried. The free acid and its alkali metal salts are colorless crystalline compounds. The 1-methylnaphthalene-7-sulphochloride melts at 107° C., the 1-methylnaphthalene-7-sulphamide at 131° C. and the 1-methylnaphthalene-7-sulphanilide melts at 149° C.

2. 300 parts of caustic soda are melted with 30 parts of water and 100 parts of the sodium salt of 1-methylnaphthalene-7-sulphonic acid are added thereto in portions, while stirring, the temperature being maintained at 280° C. The temperature is then slowly raised to 300° C. and finally for some minutes to 310° C.; the whole is then allowed to cool. The cooled mass is dissolved in water, acidified and shaken with benzene; the benzene is then distilled and the residue distilled under reduced pressure.

The 1-methyl-7-hydroxynaphthalene thus obtained crystallizes from ligroin in the form of long needles, melting at 69° C. to 70° C. The benzoyl-compound melts at 88° C., and the 8-(para-nitrobenzene-azo)-7-hydroxy-1-methylnaphthalene, obtainable by coupling with para-nitro-diazobenzene, at 262° C.

I claim:

1. The process which comprises deaminating 1-methyl-4-aminonaphthalene-7-sulphonic acid.

2. The process which comprises deaminating 1-methyl-4-aminonaphthalene-7-sulphonic acid and melting the 1-methylnaphthalene-7-sulphonic acid thus obtained in the form of its alkali metal salts with caustic alkalies.

3. The 1-methylnaphthalene-7-sulphonic acid of the following formula:

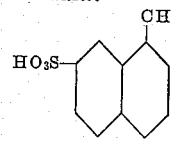

being a colorless crystalline compound which yields a sulphochloride melting at 107° C., a sulphamide melting at 131° C. and a sulphanilide melting at 149° C.

ADOLF SIEGLITZ.